United States Patent [19]

Shaw, Jr.

[11] 4,337,076
[45] Jun. 29, 1982

[54] RIBBON EDGE DETECTOR AND SYSTEM FOR METERING FLOW OF MOLTEN GLASS

[75] Inventor: Hugh E. Shaw, Jr., Crystal City, Mo.

[73] Assignee: PPG Industries, Inc., Pittsburgh, Pa.

[21] Appl. No.: 210,447

[22] Filed: Nov. 26, 1980

[51] Int. Cl.³ .............................................. C03B 18/10
[52] U.S. Cl. .......................................... 65/29; 65/99.5; 65/164; 65/158; 65/182.4; 65/182.5
[58] Field of Search ................. 65/99 A, 182.4, 182.5, 65/164, 29, 333, 158, 99.5

[56] References Cited

U.S. PATENT DOCUMENTS

| | | | |
|---|---|---|---|
| 3,438,518 | 4/1969 | Aerts | 414/148 |
| 3,482,954 | 12/1969 | Yuen | 65/29 |
| 3,500,548 | 3/1970 | Mitsuno | 33/174 |
| 3,528,795 | 9/1970 | Swillinger | 65/182 |
| 3,805,072 | 4/1974 | Gaernes et al. | 250/342 |
| 3,805,073 | 4/1974 | Jayachandra et al. | 250/353 |
| 3,977,858 | 8/1976 | Taguchi | 65/158 |
| 4,004,900 | 1/1977 | Staahl, Jr. et al. | 65/29 |
| 4,008,062 | 2/1977 | Nishikori et al. | 65/158 |

Primary Examiner—Arthur D. Kellogg
Attorney, Agent, or Firm—Donald Carl Lepiane

[57] ABSTRACT

A pair of glass ribbon edge detectors each have a power source connected to a carbon probe suspended over the molten metal bath of a glass forming chamber and to the molten metal bath to form a pair of capacitors. The voltage output of each capacitor has a first value when the probe is over the molten metal bath, a second value when the probe is over the glass ribbon and a third value when the probe is over a portion of the molten metal bath and a portion of the glass ribbon edge. Displacement and direction of displacement of each probe is used to determine glass ribbon width.

A tweel for metering glass onto the molten metal bath has linear displacement gauges mounted at each side thereof and directly connected to the tweel so as to monitor displacement of the tweel to determine the flow of molten glass into the forming chamber. Movement of the tweel in response to the capacitors' output controls the flow of molten glass to control the ribbon width.

32 Claims, 10 Drawing Figures

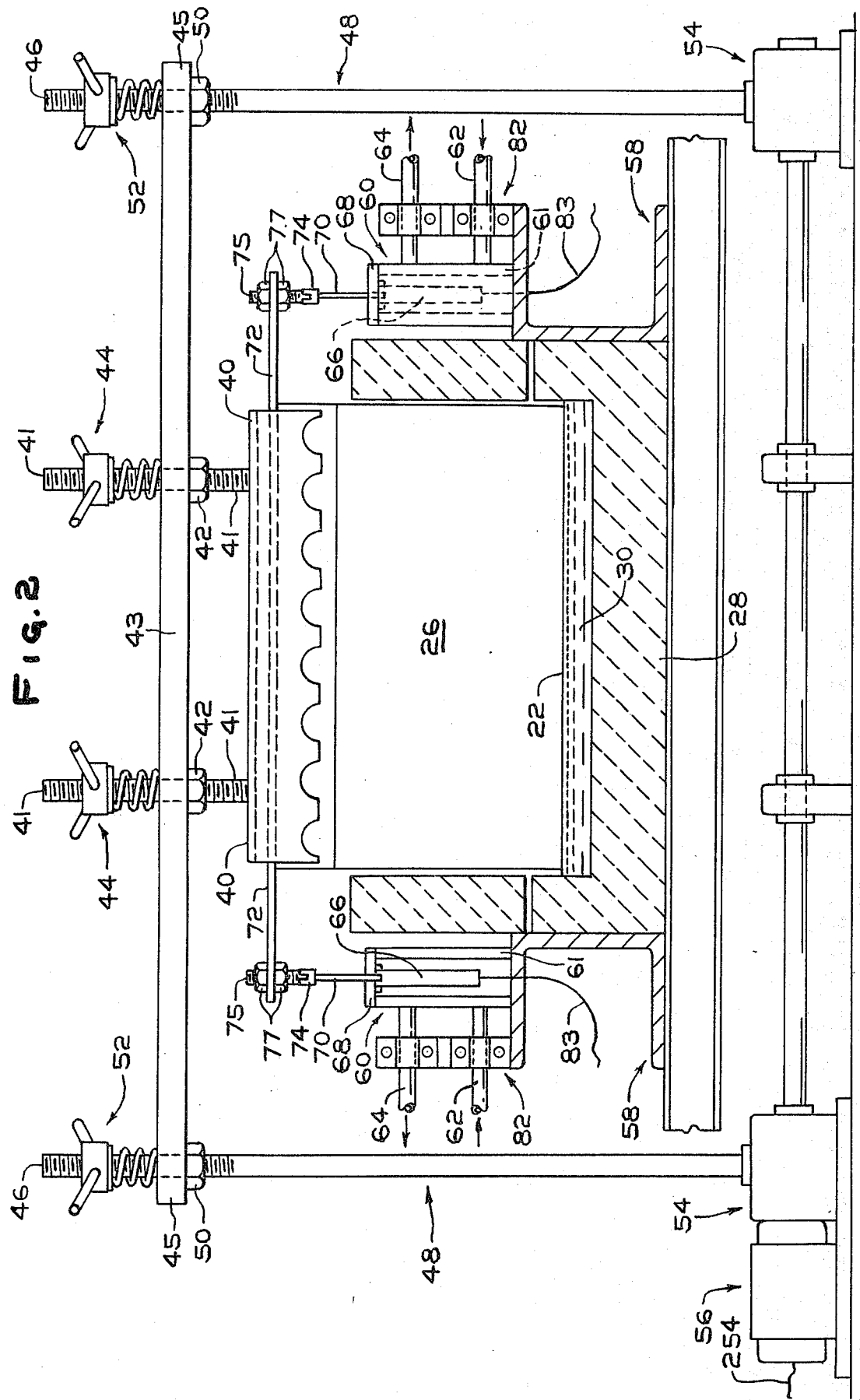

RIBBON EDGE DETECTOR AND SYSTEM FOR METERING FLOW OF MOLTEN GLASS

BACKGROUND OF THE INVENTION

1. Field of the Invention

This invention relates to a system for metering flow of molten glass from a glass melter onto a pool of molten metal contained in a forming chamber of a flat glass making apparatus. The metering system includes a glass ribbon edge detector and a device for monitoring tweel movement.

2. Discussion of the Technical Problems and Present Technology

In the manufacture of flat glass, batch materials fed into the upstream end of a melter or furnace melt into raw molten glass as they advance downstream through the melter and, thereafter, the raw molten glass is refined. The refined molten glass exits at the downstream end of the furnace, between a tweel and a threshold or lip onto a pool or bath of molten metal. The tweel is mounted for movement toward and away from the threshold to meter or control the flow of molten glass onto the pool of molten metal. The refined molten glass as it advances downstream on the molten metal pool is controllably cooled to form a glass ribbon which is lifted from the pool by lift out rolls and moved through an annealing lehr.

Factors that are known to control ribbon thickness and width include, among other things, longitudinal and lateral forces acting on the glass ribbon, temperature of the molten glass and flow of the molten glass onto the molten metal. Of particular interest in this discussion is the flow of molten glass onto the molten metal pool. More particularly, assuming that the other factors are constant or stable, decreasing the flow of molten glass decreases the ribbon width and increasing the flow of molten glass increases the ribbon width.

In U.S. Pat. No. 3,500,548, the edge of a glass ribbon is detected by suspending a plurality of spaced electrodes which conduct current when in contact with the molten metal bath at each opposite side of the ribbon. When the ribbon width decreases, ones of the spaced electrodes not supported on the glass contact the molten metal. The resultant variant electrical current is measured to determine the ribbon width. A limitation of the above technique is the electrodes contacting the ribbon surface which could mar the ribbon surface. In U.S. Pat. No. 3,482,954, the ribbon edge is sensed by projecting an annular gas stream toward the ribbon edge and sensing the back pressure. A limitation of this technique is that the air directed onto the molten metal pool may result in turbulence that could have a detrimental affect on the optical quality of the glass.

In U.S. Pat. No. 3,805,072, a glass ribbon edge detector includes a scanning telescope having a pair of cells responsive to infra red energy. The object end of the telescope is mounted above the ribbon edge in a home position as determined by sensed infra red energy. When the ribbon shifts in a direction generally transverse to its direction of motion, the output of the cells varies and the telescopes move in response thereto until the telescopes are each in a home position. The linear displacement and direction of displacement of the telescope at each opposed ribbon edge is sensed to determine the ribbon width. In U.S. Pat. No. 4,008,062, the radiation receiving end of a radiation pyrometer is inserted transversely of and above a glass ribbon supported on a molten metal pool. The radiation receiving edge reciprocably moves until a rapid temperature increase is sensed by the pyrometer to indicate the edge of the ribbon. In U.S. Pat. No. 3,977,858, two optical detectors move in a direction perpendicular to that of a glass ribbon advancing on a roller conveyer. The detector at each side of the ribbon stops upon detecting its respective ribbon edge. The distance between the detectors which corresponds to the width of the glass ribbon is indicated in a form of an electrical signal. A limitation of the ribbon edge detectors taught in U.S. Pat. Nos. 3,805,072, 4,008,062 and 3,977,858 is that the sensing elements are in a water-cooled housing to prevent thermal damage to the sensing elements and the housing. Mounting a water-cooled housing in a heated glass forming chamber necessitates specially designed equipment. Further, condensates form on water-cooled surfaces within the forming chamber and excess condensates may drop onto the ribbon surface causing surface defects. Still further, initial insertion of water-cooled equipment may upset the thermal equilibrium in the forming chamber.

In view of the above, it would be advantageous to provide a ribbon edge detector that provides ribbon width information without having the limitations of the above discussed edge detectors.

SUMMARY OF THE INVENTION

This invention relates to a method of and apparatus for sensing the edge of a substrate supported on a conductive surface, for example a glass ribbon supported on a molten metal bath. A conductive member positioned over the molten metal bath and the molten metal bath are electrically connected to a power source to provide a capacitor having a voltage output. The voltage output of the capacitor is monitored as the conductive member moves relative to the ribbon edge to detect the ribbon edge. For example, at a minimum voltage output the conductive member is positioned over the molten metal bath and at a maximum voltage output the conductive member is positioned over the glass ribbon. The range in between is a function of the ribbon edge portion between the conductive member and the metal bath.

Further, this invention relates to a method of and apparatus for following the edges of the glass ribbon by positioning a conductive member, e.g. a carbon member on each side of the ribbon to provide a pair of capacitors each having an output voltage. The output voltage of each capacitor is monitored and the conductive probe moved in response to its respective output voltage to follow the ribbon edge. The linear displacement and direction of displacement of each conductive member is used to follow the edge of the ribbon and determine the ribbon width.

Still further, this invention relates to a method of and apparatus for metering the flow rate of molten glass from a glass melter onto a pool of molten metal contained in the forming chamber. A conductive member is mounted over the molten metal bath at each side of the ribbon and connected with the molten bath to provide a pair of opposed capacitors each having a voltage output. The voltage output of each capacitor is monitored and the conductive member moved in response thereto to maintain the conductive member over the edge of the ribbon. The linear displacement and direction of displacement of each of the conductive members determine the change in ribbon width. The change in ribbon width information is analyzed to determine the direction of tweel displacement relative to the threshold or lip for increasing or decreasing the flow rate of molten glass. For example, as the ribbon width decreases, the tweel is moved away from the threshold to increase the flow rate of molten glass and as the ribbon width increases, the tweel is moved toward the threshold to decrease the flow rate of molten glass.

This invention still further relates to a tweel monitoring device for metering glass onto the molten metal bath. The device includes facilities for moving the tweel along a reciprocating path toward and away from the threshold or lip and facilities mounted on each side of the tweel and responsive to the movement of the tweel for generating a signal as a function of tweel displacement and direction along the path. For example, a linear displacement gauge mounted on each side of the tweel has its extending reciprocating rod or member connected to the tweel for direct response to the movement of the tweel. The output voltage of the gauges is acted on to determine tweel displacement and direction of displacement.

The instant invention eliminates the drawbacks of the present edge detectors by employing a conductive member, for example a carbon member which is capable of withstanding the high temperature and hostile environment of the forming chamber of a flat glass making apparatus without the need for fluid cooling equipment. By eliminating fluid cooling equipment, thermal equilibrium within the chamber is not disturbed when the carbon probe is mounted in the chamber and condensates are minimized if not eliminated because the carbon probe is at about the same temperature as the environment within the furnace. Further, the instant invention provides a tweel displacement monitoring apparatus that is operatively connected directly to the tweel. In this manner, the errors normally associated with measuring tweel displacement through the lifting arrangement is eliminated.

BRIEF DESCRIPTION OF THE DRAWING

FIG. 2 is a lateral vertical sectional view showing the delivery end of the glass melting furnace of the apparatus shown in FIG. 1 and illustrating a tweel monitoring device incorporating features of the invention;

DESCRIPTION OF THE INVENTION

Figure 1:
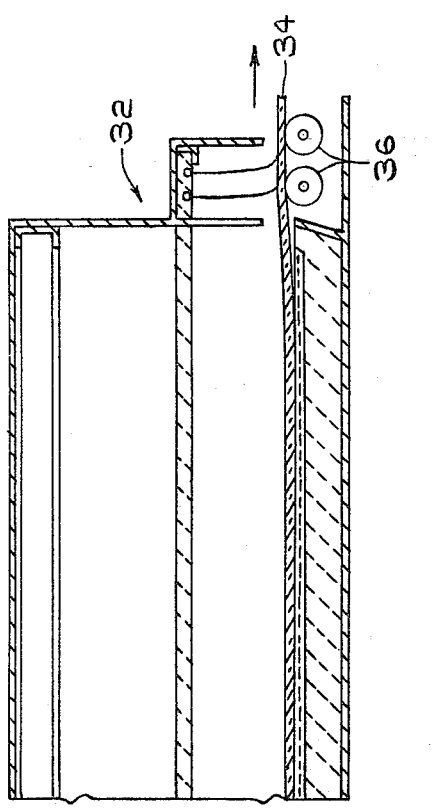
FIG. 1 is a longitudinal, vertical sectional view through a flat glass forming apparatus having features of the invention for detecting ribbon edge and measuring the width of the ribbon.

With reference to FIG. 1, batch materials (not shown) conveniently fed into melting section (not shown) of glass melting furnace 20 melt and raw molten glass flows downstream into refining section 24 of the furnace 20. Refined molten glass 22 flows between the tweel 26 and glass supporting member, e.g., threshold or lip 28 onto a molten metal pool or bath 30, e.g. a tin alloy bath. The molten glass 22, as it advances along the molten metal pool through forming chamber 32, is controllably cooled and may be attenuated to produce a dimensionally stable flat glass ribbon 34 having a desired thickness and width. The ribbon 34 is then lifted from the molten metal pool and out of the forming chamber 32 by lift out rolls 36. The glass ribbon 34 is thereafter conveniently annealed, e.g. in an annealing lehr (not shown).

As is known in the flat glass making art, various factors, or parameters, for example, attenuating forces applied to the glass in the forming chamber, temperature of the glass ribbon and flow rate of the molten glass, are considered to control the ribbon width and thickness. For purposes of clarity in describing the invention, the flow rate of the molten glass will be considered as the only varying parameter with the remaining parameters considered to be constant or stable.

The following discussion will be directed to monitoring movement of the tweel 26 relative to the threshold 28 to control or meter the flow rate of the molten glass 22 onto the metal bath 30. Although the discussion is directed to the tweel 26, the discussion is applicable to backup tweel 38 when employed. With reference to FIGS. 1 and 2 and in particular to FIG. 2, the tweel 26 is captured at its upper end in elongated clamping member 40. A pair of threaded shafts 41 rotatably secured at one end to the clamping member 40 passes through threaded nuts 42 secured on elongated beam 43. A biasing spring assembly 44 mounted on each threaded shaft 41 secures the shafts 41 in position against vibration. The shafts 41 are used for initial coarse adjustment of the tweel position relative to the threshold 28.

Ends 45 of the beam 43 are mounted on adjacent end 46 of the threaded lifting shafts 48 by a bottom nut 50 secured on the beam 43 and upper biasing collar and spring assembly 52. Each of the shafts 48 are mounted in its respective gear box 54 which are conveniently powered by reversible motor 56 to rotate the shafts in a first direction to raise the tweel 26 and in an opposite second direction to lower the tweel 26 as viewed in FIG. 2. The above discussion of the tweel and its operation is not limiting to the invention and is presented to illustrate one environment in which the invention may be practiced.

With continued reference to FIG. 2, mounted on "C" channel or bucking plate 58 of melter and forming chamber superstructure is an open ended cylinder 60 having an outer fluid circulating chamber 61 connected to fluid e.g. water inlet pipe 62 and fluid outlet pipe 64 for cooling linear displacement measuring gauge 66 mounted in the cylinder 60. The gauge 66 is connected to the tweel 26 in any convenient manner, e.g. but not limiting to the invention, the gauge 56 e.g. a Longfellow ® linear motion position transducer is conveniently secured to plate 68 secured on upper end of the cylinder 60. Extendable rod 70 of the transducer 66 passes through the plate 68 and is conveniently secured to spanning member 72 conveniently secured to the top side of the tweel 26 as shown in FIG. 2. The transducer rod 70 is conveniently secured to the spanning member 72 and the cylinder 60 is conveniently secured on the bucking plate 58 in a manner to be quickly and easily removed to provide immediate access to the tweel area. For example, the transducer rod 70 has a magnet 74 secured to its end which magent 74 is attached to an adjustment screw 75 secured to the spanning member 72 by bolts 77. The cylinder 60 is held on the bucking plate 58 by conveniently securing pipe holding member 82 to the bucking plate 58 and securing the rigid pipes 62 and 64 in the holding member 82.

Figure 3:
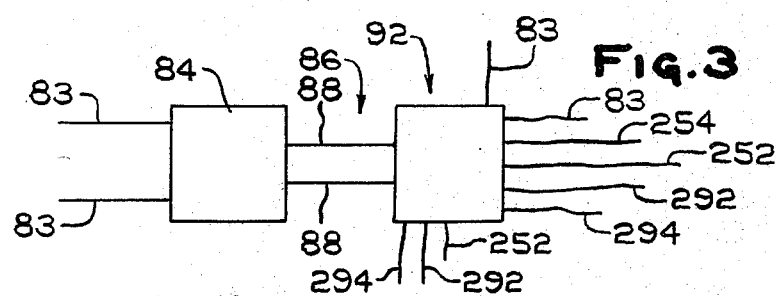
FIG. 3 is a block diagram illustrating the arrangement of electrical components for monitoring tweel displacement and ribbon width in accordance with the teachings of the invention to meter glass flow from the melting chamber into the forming chamber to control the ribbon width.

As the tweel 26 moves upward or downward the transducer rods 70 are extended or retracted respectively which forwards a signal along its respective wire 83 to signal conditioner 84 of circuit 86 shown in FIG. 3. The conditioner 84 amplifies and conditions the signal to prevent noise pick up during transmission of the signal along its respective lines 88 to computer 92. The computer 92 analyzes each signal to determine the direction and linear displacement of the tweel 26, e.g. the linear displacement and as indicated by the signal from the gage 66 on each side of the tweel is added and divided by 2 to give an average linear displacement. In the alternative signal along wires 83 may be sent directly to the computer 92. In the following discussion, the average linear displacement information is used to meter the flow rate of the molten glass 22 from the refining section 24 into the forming chamber 32 to maintain a predetermined constant ribbon width.

Figure 4:
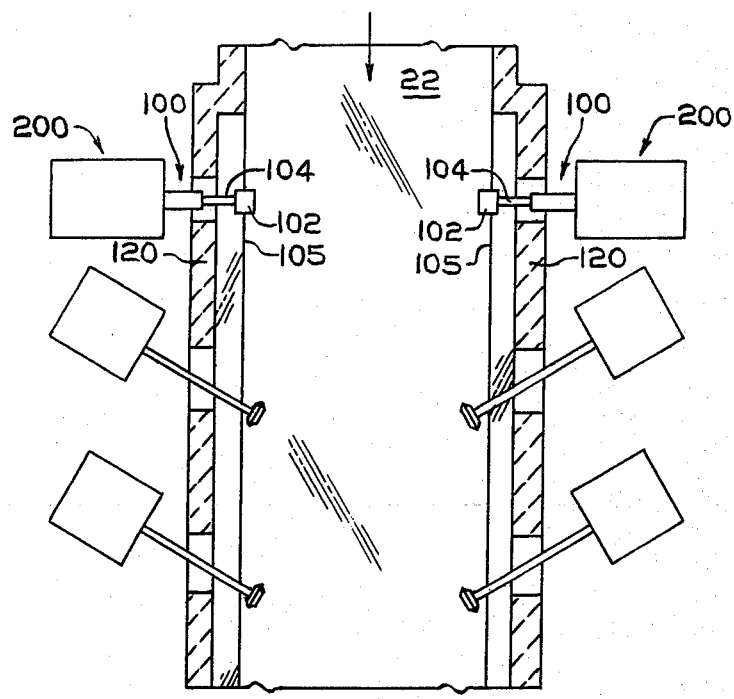
FIG. 4 is a fragmented, top-sectional view of the forming chamber of the apparatus of FIG. 1 illustrating the position of the ribbon edge detector incorporating features of the invention.

With reference to FIGS. 1 and 4, the flow rate of molten glass 22 into the forming chamber 32 for purposes of discussing the invention is a function of the width of the molten glass immediately downstream of the threshold or lip 28 which is measured by edge detector 100 incorporating features of the invention mounted at each side of the molten glass ribbon as shown in FIG. 4. In the art of making flat glass, the molten glass 22 on the molten metal bath 30 immediately downstream of the threshold 28 may have an onion shape as taught in U.S. Pat. No. 3,083,551 or a ribbon shape as taught in U.S. Pat. No. 3,843,346 and shown in FIG. 4. The teachings of the above mentioned U.S. patents are hereby incorporated by reference. As will be appreciated, the instant invention may be practiced on molten glass either having a ribbon and/or onion shape. Further, the instant invention may be practiced on a ribbon located in any position in the forming chamber or on conveyor rolls, e.g. in an annealing lehr. Still further, the invention may be practiced on a substrate supported on a solid conductive surface.

Each edge detector 100 includes a probe 102 mounted on an elongated shaft 104. The elongated shaft 104, as will be discussed, moves the probe 102 spaced from and across the molten metal bath 30 relative to the adjacent ribbon edge 105. Preferably, the probe 102 and shaft 104 are made of a material capable of withstanding the hostile environment in a glass forming chamber 32 without being fluid cooled and at least the probe 102 is capable of conducting current to form a capacitor when electrically connected to the molten metal bath 30 in a manner discussed below. Preferably the probe 102 and shaft 104 are made of carbon but steel and other conductive materials may be used if they are capable of withstanding the atmosphere of the chamber containing the ribbon or substrate. Shown in FIG.. 5, is a shaft 104 and probe 102 that may be used in the practice of the invention and includes an outer steel sheath 111 having a carbon insert 113. The carbon insert provides electrical conductivity and the sheath protects the carbon insert against breakage. Electrical access to the carbon insert 113 of the probe 102 is made by screws 115 and 117.

Figure 6:
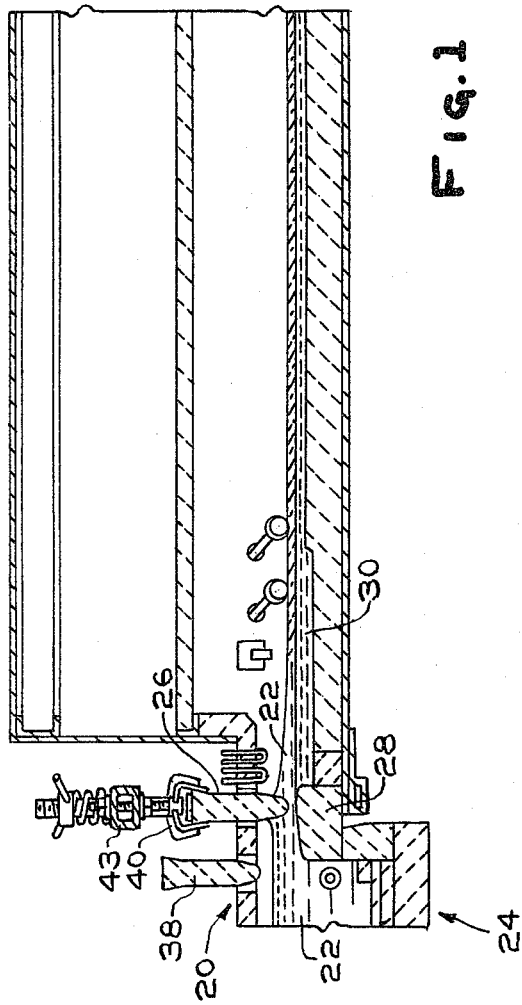
FIG. 6 is a fragmented, lateral sectional view of the forming chamber of FIG. 1 and a circuit that may be used in the practice of the invention to determine the location of the ribbon edge.

In FIG. 6 there is shown alternating current source 126 connected at one output to the screw 117 of the shaft 104 by wire 128 with its other output connected to one side of resistor 130 by wire 131. The other side of the resistor 130 is connected to wire 133 to the molten metal bath 30 to provide a capacitor 135 (shown in phantom) between the probe 102 and the metal bath 30. With this arrangement, the impedance of the above described circuit measured about the resistor 130 is as follows:

$$Z = \sqrt{R^2 + \left(\frac{1}{2\pi f C_p}\right)^2}$$

where
Z is the impedance;
R is the value of the resistor 130

$$\frac{1}{2\pi f C_p}$$

is the capacitive reactance;
$C_p$ is the value of the capacitor 135; and
f is the frequency of the alternating current source 126.

Kirchhoffs Second Law states that the instantaneous voltage sum of the voltage drops around a circuit, including the source taken as negative is equal to zero. Therefore, the instantaneous source voltage will be divided between the resistor 130 and capacitor 135 in a ratio that changes when the capacitance of the capacitor 135 changes. For example and in accordance to the teachings of the invention, the current flow through the resistor 130 increases to increase the voltage across the resistor 130 as the probe 102 moves over the glass to increase the capacitance of the capacitor 135. Conversely, the current flow through the resistor 130 decreases to decrease the voltage across the resistance 130 as the probe moves over the bath 30 to decrease the capacitance of the capacitor 135.

The voltage across the resistor 130 is used, in any convenient manner, as a reference to a fixed source to control a servo motor to follow the ribbon edge 105. For example, the wire 133 connected to the wire 133 connected to the metal bath 30 and one side of the resistor 130 is also connected to one side of a capacitor 132, one side of an adjustable resistor 134 and negative side of D.C. power source 136. The other side of the resistor 130 is connected by the wire 131 to alternating power supply 126 and input end of rectifier 140 to convert A.C. current to D.C. current. The output end of the rectifier 140 is connected by wire 148 to the other end of the capacitor 132 and an input of servo amplifier 142. The other input of the servo amplifier 142 is connected by wire 149 to wiper arm 144 of the adjustable resistor 134. The other side of the adjustable resistor 134 is connected by wire 151 to positive side of the D.C. power source 136.

Figure 7:
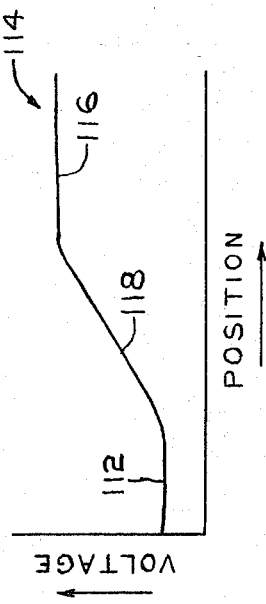
FIG. 7 is a graph illustrating typical voltage output value of the circuit of FIG. 6 as a function of ribbon edge detector position in accordance with the teachings of the invention.
Figure 5:
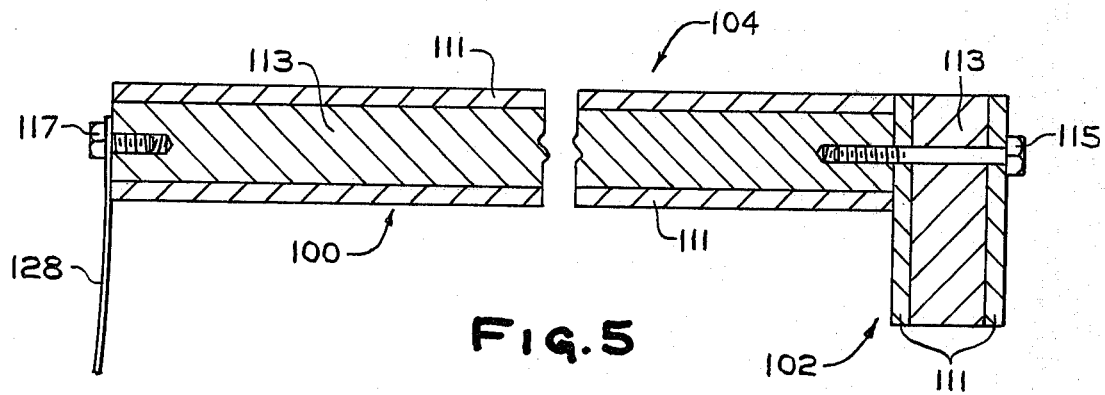
FIG. 5 is a fragmented, side-sectional view of a support arm and probe illustrating an edge detector incorporating features of the invention.

With reference to FIG. 7 there is shown curve 114 which graphically illustrates the expected or typical direction of voltage output of the capacitor 135 as a function of position of the probe 102 relative to the ribbon edge. When the probe 102 is positioned over the molten metal bath 30 the air gap therebetween is the greatest and the voltage measured across the resistor 130 is at a minimum as illustrated by segment 112 of the curve 114. When the probe 102 is completely over the glass ribbon 22 the air gap is at its minimum and the voltage measured across the resistor 130 is at a maximum as indicated by segment 116 of the curve 114. As the probe 102 moves from left to right as viewed in FIG. 5 over edge portions 105 of the ribbon 22, the voltage across the resistor 130 increases as the spacing between the probe 102 and molten metal bath 30 decreases and is illustrated as segment 118 of the curve 114. As can now be appreciated, the invention may be practiced on an electrically conductive substrate, e.g. heated glass or on a nonconductive substrate, e.g. glass at room temperature.

Changes in the ribbon width may be determined by positioning the probe 102 of the detectors 100 over an edge portion 105 of the ribbon so that the output voltage of the detector 100 is at a selected value in the curve segment 118 which is referred to as a home position. The voltage value is set into reference circuit 122 by adjusting the adjustable resistor 134. As the voltage across the resistor 130 increases or decreases, the servo amplifier 142 receives different signal values from the wires 148 and 149 and forwards a signal to motor 146 to move the probe 102 in the proper direction for the needed displacement so that the signal values received from the wires 148 and 149 are equal indicating that the probe 102 is in the home position. For example, if the ribbon edge moves away from the chamber wall, the voltage across the resistor 130 decreases and the servo amplifier 142 sensing the difference between the signal values received from the wires 148 and 149 actuates the motor 148 to move the probe 102 away from the chamber sidewall toward the ribbon edge. As the probe 102 moves over the ribbon edge the voltage across the resistor 130 increases. When the voltage across the resistor 130 provides a signal value along the wire 148 that is equal to the signal value along the wire 149 the probe 102 is in the home position and the servo amplifier 142 de-energizes the motor 146. Conversely, if the ribbon edge 105 moves toward the chamber sidewall the voltage across the resistor 130 increases and the servo amplifier 142 determines a difference between the signal value along the wires 148 and 149 and forwards a signal to energize the motor 146. The motor 146 moves the probe 102 towards the chamber sidewall until the voltage across the resistor 130 provides a signal value along the wire 148 that is equal to the signal along the wire 149 at which time the probe is in the home position and the motor 146 is de-energized. The linear displacement of each probe 102 and direction of displacement are used in any convenient manner to determine ribbon width changes or ribbon position.

In another embodiment, the probe 102 is displaced toward and away from the sidewall 120 to locate the ribbon edge. For example, as the probe 102 moves over the molten bath 30 away from the chamberwall 120 the signal value along the wire 148 is at a minimum. As the probe 102 moves over the ribbon edge portion 105 the signal value along the wire 148 increases signaling the probe 102 is over a portion of the ribbon. When the signal value along the wire 148 is at a maximum, the probe is over the ribbon. Monitoring the signal value along the wire 148 and displacement of the probe 102 the ribbon edge is located. The technique is recommended when circuit changes and temperature changes are expected because the location of the ribbon is independent of the value of the signal along the wire 148 and is located by the increase in signal value along the wire 148. The above technique may also be used as a calebration check by comparing past and present signal values along the wire 148.

As can now be appreciated, as the surface of the member 102 facing the molten metal bath decreases, the length and slope of the curve segment 118 decreases and vice versa. Further, the portion 112; 116 and 118 of the curved 114 may be slightly curve, e.g. concave and convex instead of linear as shown in FIG. 7 due to ribbon thickness variations and non-parallelism between the probe and metal bath. By decreasing the length and slope of the curve 118 smaller incremental changes in the ribbon edge position can be detected. The invention has been practiced using a graphite probe having a surface area facing the ribbon of about 12 square inches (77.4 square centimeters) and spaced about 2 inches (5.08 centimeters) from the molten metal bath.

Figure 9:
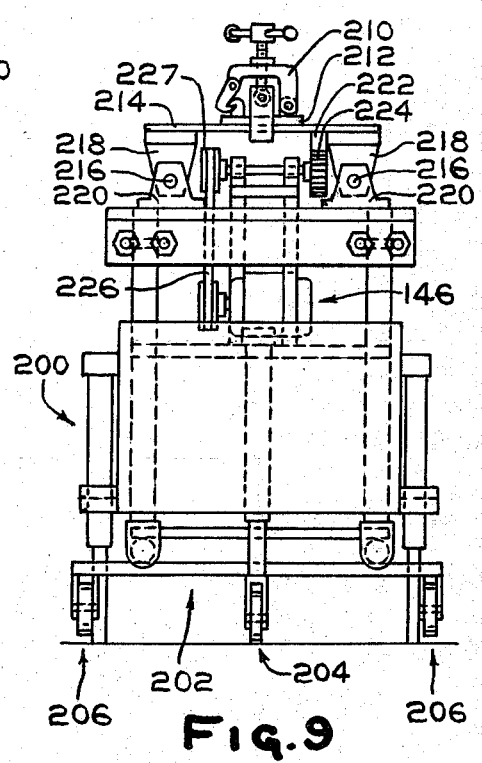
FIG. 9 is a front elevational view of the carriage shown in FIG. 8.
Figure 8:
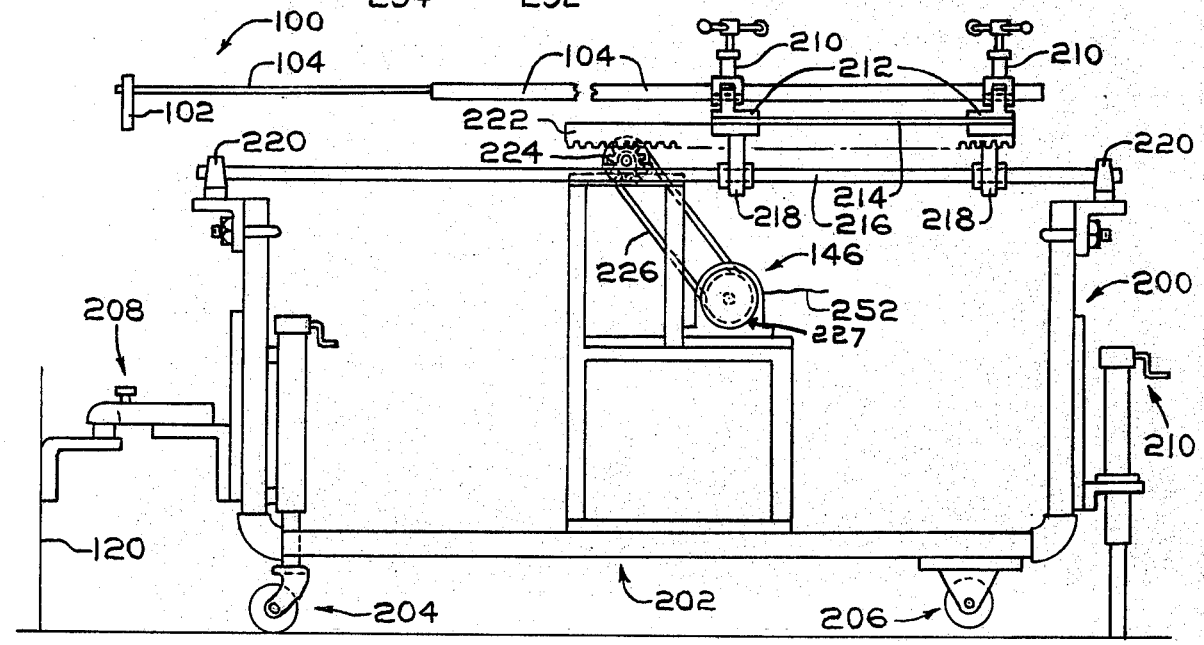
FIG. 8 is a side elevational view of a carriage incorporating features of the invention for positioning and moving a ribbon edge detector relative to the ribbon edge.

With reference to FIGS. 8 and 9 there is shown carriage 200 that may be used in the practice of the invention for mounting the edge detector 100 in the chamber 32 and moving the edge detector 100 toward and away from the chamber sidewall 120 relative to the ribbon edge 105. The carriage 200 includes a base 202 having wheel assemblies 204 and 206 for moving the carriage 200 to the chamber sidewall 120 and a hitch assembly 208 and jack 210 for leveling and securing the carriage 200 in position to the outer surface of the chamber sidewall 120 as shown in FIG. 8.

The arm 104 of the edge detector 100 is secured in a pair of pipe vices 210 secured in spaced alignment on an electrically nonconductive substrate 212, e.g., a plastic board to electrically isolate the edge detector 100. The substrate 212 is conveniently secured to platform 214 mounted on spaced guiderails 216 by way of bearing blocks 218. The guiderails 216 are secured on the base 202 by collars 220. Mounted on the platform 214 is rack 222 which meshes with pinion 224 as shown in FIG. 8. The pinion 224 is driven by the reversible motor 146 discussed above through endless belt 226 and pully 227 as shown in FIG. 8.

Figure 10:
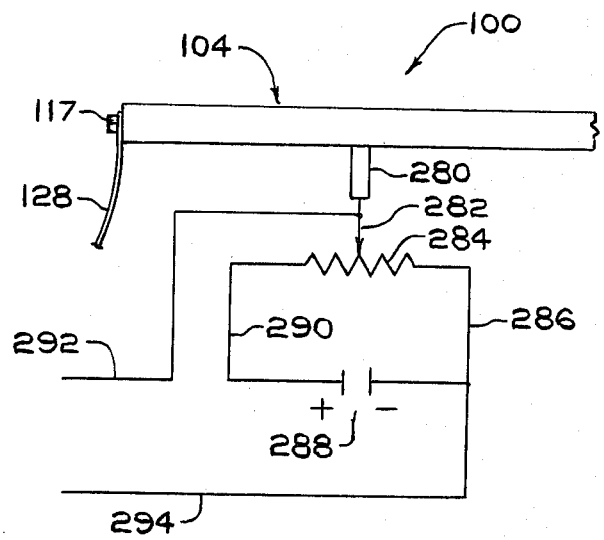
FIG. 10 is a fragmented, lateral side view of the probe illustrated in FIG. 5 and a circuit that may be used in the practice of the invention to determine linear displacement of the probe.

The displacement and direction of displacement of the detectors 100 is determined in any convenient manner. For example, and with reference to FIG. 10 an electrical insulator 280 secured to the arm 104 of the detector 100 is connected to wiper arm 282 of an adjustable resistor 284. One side of the adjustable resistor is connected by wire 286 to negative side of a D.C. power source 288 and the other side of the adjustable resistor 284 is connected by wire 290 to positive side of the D.C. power source 288. The wiper 282 of the resistor 284 and one side of the resistor 284 are connected to the computer by wire 292 and 294 respectively, to measure displacement and direction of displacement of the detector 100. For example, as the voltage across the wires 292 and 294 increases the probe 100 is moving toward the chamber sidewall away from the ribbon edge 105 and vice versa. The amount of increase or decrease indicates amount of linear displacement. The direction and linear displacement of the opposed detectors 100 can be used to determine width changes of the ribbon.

The tweel monitoring device 60 and edge detector 100 are used to maintain a substantially constant ribbon width by metering the flow rate of the molten glass from the melter into the forming chamber in response to the ribbon width change. In this embodiment of the invention, the tweel 26 is adjusted relative to the threshold 28 for a predetermined flow rate of molten glass to provide a molten ribbon of a desired thickness and width supported on the molten metal bath immediately downstream of the threshold 28. An edge detector 100 is positioned over opposed edge portions 105 of the molten ribbon as shown in FIG. 4 and the adjustable resistor 144 (FIG. 6) is set as previously discussed to indicate a home position for its respective detector. The output of the servo amplifier 142 (FIG. 5) which is connected to the motor 146 is also connected to the computer 92 (FIG. 3) by cable 252. A continuous ribbon width immediately downstream of the threshold as indicated by the equal signals along wires 148 and 149 requires no change of the tweel position relative to the threshold 28. If the ribbon width decreases, a difference between the signals along the wires 148 and 149 is sensed by the amplifier 142. Upon sensing the difference the amplifier 142 forwards a signal to the motor 146 and to the computer 92. The motor 142 is energized to move the probe 102 in the proper direction to vary the signal value along the wire 148 to make it equal to the signal value along the wire 149. When the detectors 100 are in the home position the displacement and direction of displacement for each detector is determined by the signal value received along the wires 292 and 294 from each detector. The computer 92 has received the information of the current position of the detectors, current position of the tweel 26 and has a history of previous positions and adjustments programmed. From this information along with the temperature of the glass and molten metal bath, flow of molten glass, a determination of direction and rate of change of the tweel adjustment can be made to maintain a constant ribbon width downstream of the tweel.

After the information has been analyzed by the computer and the tweel direction and rate of change for the tweel adjustment is determined, the computer 92 forwards a signal along cable 254 to motor 56 (FIG. 2) to rotate the shafts in the proper direction to change the tweel position to change the volume of molten glass flowing between the tweel and threshold to maintain a constant onion or ribbon width. As can be appreciated, a stable condition of molten glass flow is normally required and therefore the measuring of the ribbon width to determine if tweel adjustment is needed is normally based on past history stored in the computer and current measurements.

As can now be appreciated, the above examples are presented to illustrate various embodiments of the invention and the invention is not limited thereto. For example, audio and visual alarms may be used to indicate the need for changes to control position and width of the ribbon. Further leving devices may be mounted on the carriage to move the probe in a plane generally parallel to the surface of the ribbon and/or bath.

I claim:

1. A method of sensing an edge of a substrate supported on a conductive surface, comprising the steps of:
    positioning a conductive member in spaced relation to the conductive surface;
    electrically connecting the conductive member and conductive surface to a power source to provide a capacitor having a voltage output; and
    monitoring the voltage output of the capacitor as the conductive member moves relative to the substrate edge to detect the substrate edge.

2. The method as set forth in claim 1 wherein the conductive member is over portions of the substrate edge when the voltage output of the capacitor is between its maximum and minimum voltage output values.

3. The method as set forth in claim 1 wherein the substrate is a glass ribbon and the conductive surface is the surface of a molten metal bath contained in a flat glass forming chamber.

4. A method of following the edge of a substrate advancing along a substrate path on a conductive surface, comprising the steps of:
    positioning a conductive member over the conductive surface;
    electrically connecting the conductive member and the conductive surface to a power source to provide a capacitor having an output voltage;
    monitoring the output value of the capacitor; and
    moving the conductive member in a first direction relative to the substrate edge when the capacitor output value is below a first predetermined value and in the second opposite direction when the capacitor output value is above a second predetermind value.

5. The method as set forth in claim 4 wherein the first and second predetermined values are the same.

6. The method as set forth in claim 4 wherein opposite edges of the substrate are followed and further comprising the steps of:
    practicing said positioning step; said electrically connecting step; said monitoring step and said moving step adjacent opposed edges of the substrate; and
    determining direction and displacement of each conductive member from its output voltage to determine changes in substrate width.

7. The method as set forth in claim 6 wherein the opposite edges of the substrate are followed to determine substrate width and further including the step of determining the width of the substrate from capacitor outuput voltage of each conductive member.

8. The method as set forth in claim 4, 6 or 7 wherein the substrate is a glass ribbon and the conductive surface is the surface of a molten metal bath contained in a flat glass forming chamber.

9. An apparatus for following the edge of a substrate advancing along a substrate path on a conductive surface, comprising:
    a conductive member;
    means for moving said member across the conductive surface;
    electrical means including a power source connected to said conductive member and the conductive surface to provide a capacitor having a first output voltage when said conductive member is over the conductive surface, second output voltage when said conductive member is over the substrate and a third output voltage when said conductive member is over a portion of the conductive surface and an edge portion of the substrate; and means responsive to the output voltage of said capacitor and acting on said moving means to move said conductive member relative to the edge of the substrate to follow the edge of the substrate.

10. The apparatus as set forth in claim 9 wherein said electrical means further includes a reference circuit further including:

means for comparing the output voltage of said capacitor to output voltage of said reference circuit and acting on said moving means when there is a difference therebetween.

11. The apparatus as set forth in claim 10 wherein said conductive member includes an elongated arm of a conductive material and said moving means includes:
means for supporting said arm;
a platform;
means for mounting said supporting means on said platform;
a carriage;
means for moving said platform on said carriage along a reciprocating linear path; and
means for electrically isolating said supporting means from the conductive surface.

12. The apparatus as set forth in claim 11 wherein portions of said conductive member are made of carbon; said platform and carriage are made of metal and said electrical isolating means includes;
electrical isolating means between said supporting means and said platform.

13. The apparatus as set forth in claim 12 wherein the conductive surface is the surface of a molten metal bath and the substrate is a glass ribbon.

14. The apparatus as set forth in claim 9 for following the edge of the ribbon to determine changes in ribbon width, further comprising:
a second conductive member;
second means for moving said second conductive member across the conductive surface;
second electrical means including a power source connected to said second conductive member and the conductive surface to provide a second capacitor having a first output voltage when said second conductive member is over the conductive surface, a second output voltage when said second conductive member is over the substrate and a third output voltage when said second conductive member is a portion of the conductive surface and edge portions of the substrate;
second means responsive to the output voltage of said second capacitor and acting on said second moving means to move said second conductive member relative to the edge of the substrate to follow the edge of the substrate; and
means for measuring displacement of said first and second conductive members to determine changes in ribbon width.

15. The appratus as set forth in claim 14 wherein said first and second electrical means each further include a reference current and further including:
means for comparing the output voltage of said first and second capacitor to said output voltage of said reference circuit and acting on said first and second moving means when there is a difference therebetween.

16. The apparatus as set foth in claim 15 wherein said first and second conductive members each include an elongated arm of a conductive material and said first and second moving means each include:
means for supporting its respective elongated arm;
a platform;
means for mounting said supporting means on said platform;
a carriage;
means for moving said platform on said carriage along a reciprocating linear path; and
means for electrically isolating said conductive member from the conductive surface.

17. The apparatus as set forth in claim 16 wherein portions of said first and second conductive members are made of carbon and said platforms and carriages for supporting the first and second conductive members are made of metal and said respective electrical isolating means includes:
electrical isolating means between said supporting means in said platform.

18. The apparatus as set forth in claim 17 wherein the conductive surface is the surface of a molten metal bath and the substrate is a glass ribbon.

19. In a method of producing a continuous glass ribbon comprising the steps of metering a predetermined amount of molten glass between a glass supporting member and a movable tweel onto a molten metal bath contained in a forming chamber, flowing the molten metal glass downstream on the molten metal while controllably cooling the glass to provide a glass ribbon of a predetermined thickness and width and removing the ribbon from the molten metal bath wherein the improvement comprises the steps of:
positioning a first conductive member on one side of the molten glass immediately downstream of the glass supporting member and a second conductive member on the opposite side of the molten glass immediately downstream of the glass supporting member;
electrically connecting the first and second conductive members and the molten metal bath to a power source to provide a first and second capacitor respectively each having an output voltage;
monitoring the output voltage of the first and second capacitor;
moving the first and second conductive member in a first direction relative to the ribbon when the capacitor output value is below a first predetermined value and in a second opposite direction when the capacitor output value is above a second predetermined value;
determining direction and linear displacement of each conductive member from their respective capacitor output voltage; and
moving the tweel to meter the flow of molten glass required to maintain a relatively constant width of molten glass.

20. The method as set forth in claim 19 wherein the first and second predetermined values are the same.

21. The method as set forth in claim 19 wherein said monitoring step includes the step of comparing the output voltage of each capacitor to a reference voltage and practicing said moving step when the voltage output of at least one capacitor is different than the reference voltage wherein the reference voltage is selected to indicate that the conductive member is over a portion of the molten metal bath and a portion of the ribbon edge.

22. An apparatus for making a continuous glass ribbon wherein the apparatus is of the type having a molten metal bath contained in a forming chamber; a glass supporting member; a tweel; means for moving the tweel toward and away from the glass supporting member to meter a predetermined amount of molten glass onto the molten metal bath; means for controllably cooling the molten glass as it advances downstream on the molten metal bath to provide a glass ribbon of a predetermined thickness and width; and means for removing the glass ribbon from the molten metal bath, comprising:
  a first conductive member;
  means for moving said first member across the molten metal bath in spaced relation thereto;
  electrical means including a power source connected to said conductive member and the molten metal bath to provide a capacitor having a first output;
  a second conductive member;
  second means for moving said second conductive member across the molten metal bath in spaced relation thereto;
  electrical means including a power source connected to said first and second conductive members and the molten metal bath to provide first and second capacitors, respectively, each of said capacitors having a first output voltage when said conductive members are over the molten metal bath, a second output voltage when said conductive members are over the glass ribbon and a third output voltage when said conductive members are over a portion of the molten metal bath and ribbon edge portions;
  means responsive to the output voltage of said first and second capacitors for moving said first and second conductive member relative to its adjacent ribbon edge to follow the ribbon edge;
  means for determining direction and linear displacement of each conductive member; and
  means responsive to said determining means and acting on said means for moving the tweel for metering the flow of molten glass to maintain a relatively constant width of molten glass.

23. The apparatus as set forth in claim 22 wherein said electrical means further includes first and second reference circuits and further including:
  means for comparing the output voltage of said first and second capacitors to the output voltage of said first and second reference circuits and acting on said first and second monitoring means respectively when there is a difference therebetween.

24. The apparatus as set forth in claim 23 wherein said conductive members includes an elongated arm of a conductive material and said first and second moving means each include:
  means for supporting its respective arm;
  a platform;
  means for mounting said supporting means on said platform;
  a carriage;
  means for moving said platform on said carriage along a reciprocating path; and
  means for electrically isolating said supporting means from the molten metal bath.

25. The apparatus as set forth in claim 24 wherein portions of said conductive member are made of carbon in a sleeve of rigid material; said platform and carriage are made of metal and electrical isolating means includes:
  electrical isolating means between said supporting means and said platform.

26. The apparatus as set forth in claim 22, 23 or 24 wherein said metering means includes:
  means for measuring linear displacement mounted on each side of the tweel;
  means for operatively connecting each of said measuring means to adjacent side of the tweel to generate an output signal from each of said measuring means when the tweel moves relative to the glass supporting member; and
  means for monitoring the output signal of each of said measuring means to determine the movement and direction of tweel displacement relative to the glass supporting member.

27. The apparatus as set forth in claim 26 wherein each of said connecting means includes said measuring means mounted in cooling means to prevent thermal damage thereto.

28. The apparatus as set forth in claim 27 wherein each of said cooling means includes:
  a housing;
  an inlet pipe and an outlet pipe connected to said housing;
  means for mounting said housing adjacent the tweel;
  a spanning member secured to the tweel;
  adjustment means mounted on said spanning member; and
  means for interconnecting said measuring means and said adjustment means to move said measuring means in response to the movement of the tweel.

29. An apparatus for making a continuous glass ribbon wherein the apparatus is of the type having molten metal batch contained in a forming chamber; a glass supporting member; a tweel; means for moving the tweel toward and away from the glass supporting member to meter a predetermined amount of molten glass onto the molten metal bath; means for controllably cooling the molten glass as it advances downstream on the molten metal bath to provide a glass ribbon of a predetermined thickness and width; and means for removing the glass ribbon from the molten metal bath, comprising:
  means for measuring linear displacement, said measuring means including a reciprocating member;
  means for mounting said measuring means to structure of the apparatus adjacent a side of the tweel;
  means for connecting said reciprocating member of said measuring means directly to the tweel to generate an output signal from said measuring means as a direct function of movement and direction of tweel displacement relative to the glass supporting member; and
  means for monitoring the output signal of said measuring means to determine the movement and direction of the tweel displacement relative to the glass supporting member.

30. The apparatus as set forth in claim 29 wherein said measuring means is a first measuring means and further including:
  second means for measuring means, said second measuring means including a reciprocating member;
  means for mounting said second measuring means to the structure of the apparatus adjacent the opposite side of the tweel;

means for connecting said reciprocating member of said second measuring means directly to the tweel to generate an output signal from said second measuring means as a direct function of movement and direction of tweel displacement relative to the glass supporting member; and said monitoring means monitors the output signal of said first and second measuring means to determine the movement and direction of the tweel displacement relative to the glass supporting member.

31. The apparatus as set forth in claim 29 or 30 wherein each of said connecting means includes said measuring means mounted in cooling means to prevent thermal damage thereto.

32. The apparatus as set forth in claim 31 wherein each of said cooling means includes:
   a housing;
   an inlet pipe and an outlet pipe connected to said housing;
   means for mounting said housing adjacent the tweel;
   a spanning member secured to the tweel;
   adjustment means mounted on said spanning member; and
   means for interconnecting said measuring means and said adjustment means to move said measuring means in response to the movement of the tweel.

* * * * *